US012664731B2

(12) United States Patent
Seymour

(10) Patent No.: US 12,664,731 B2
(45) Date of Patent: Jun. 23, 2026

(54) SYSTEMS AND METHODS FOR PROCESSING WHOLE SLIDE IMAGES USING MACHINE-LEARNING

(71) Applicant: PAIGE.AI, Inc., New York, NY (US)

(72) Inventor: Samuel Seymour, Portland, OR (US)

(73) Assignee: Paige.AI, Inc., New York, NY (US)

( * ) Notice: Subject to any disclaimer, the term of this patent is extended or adjusted under 35 U.S.C. 154(b) by 39 days.

(21) Appl. No.: 18/643,400

(22) Filed: Apr. 23, 2024

(65) Prior Publication Data

US 2024/0362865 A1      Oct. 31, 2024

Related U.S. Application Data

(60) Provisional application No. 63/498,342, filed on Apr. 26, 2023.

(51) Int. Cl.
G06T 19/00          (2011.01)
G06T 7/30           (2017.01)
G06T 7/73           (2017.01)
(52) U.S. Cl.
CPC ................ G06T 19/00 (2013.01); G06T 7/30 (2017.01); G06T 7/73 (2017.01); G06T 2200/24 (2013.01);
(Continued)
(58) Field of Classification Search
None
See application file for complete search history.

(56) References Cited

U.S. PATENT DOCUMENTS 9,129,362 B2     9/2015  Jerebko
11,393,574 B1    7/2022  Ceballos Lentini et al.
(Continued)

FOREIGN PATENT DOCUMENTS

EP          3219261 A1     9/2017

OTHER PUBLICATIONS

Jansen, I., Lucas, M., Savci-Heijink, C.D. et al. Three-dimensional histopathological reconstruction of bladder tumours. Diagnostic Pathology 14, 25 (2019). https://doi.org/10.1186/s13000-019-0803-7.

(Continued)

*Primary Examiner* — Tapas Mazumder
(74) *Attorney, Agent, or Firm* — Bookoff McAndrews, PLLC

(57)          ABSTRACT
According to systems and techniques disclosed herein, a method for generating a navigable three-dimensional image of a tissue sample may include receiving a plurality of whole slide images (WSI) associated with the tissue sample. The method may further include providing the plurality of whole slide images to a machine-learning model. The machine-learning model may have been trained to identify one or more positional features within the plurality of whole slide images and output a plurality of relative positional relationships corresponding to each of the plurality of whole slide images. The method may further include generating the navigable three-dimensional image of the tissue sample based on the plurality of relative positional relationships. The method may further include generating an interactive display incorporating the navigable three-dimensional image. The method may further include providing, to a user interface, the interactive display.

20 Claims, 5 Drawing Sheets

(52) U.S. Cl.
CPC ............... *G06T 2207/20081* (2013.01); *G06T 2207/30024* (2013.01); *G06T 2210/41* (2013.01)

(56) References Cited

U.S. PATENT DOCUMENTS

| | | | | |
|---|---|---|---|---|
| 2008/0205776 A1* | 8/2008 | Shafirstein | ........... | G06V 20/695 |
| | | | | 382/232 |
| 2021/0264599 A1* | 8/2021 | Gong | ..................... | G06N 3/045 |
| 2022/0130038 A1* | 4/2022 | Wang | ................... | G06N 3/0464 |

OTHER PUBLICATIONS

Kartasalo, K. (2021). Machine Learning and 3D Reconstruction Methods for Computational Pathology. (Tampere University Dissertations—Tampereen yliopiston väitöskirjat; vol. 415). Tampere University. http://urn.fi/URN: ISBN:978-952-03-1953-3.

* cited by examiner

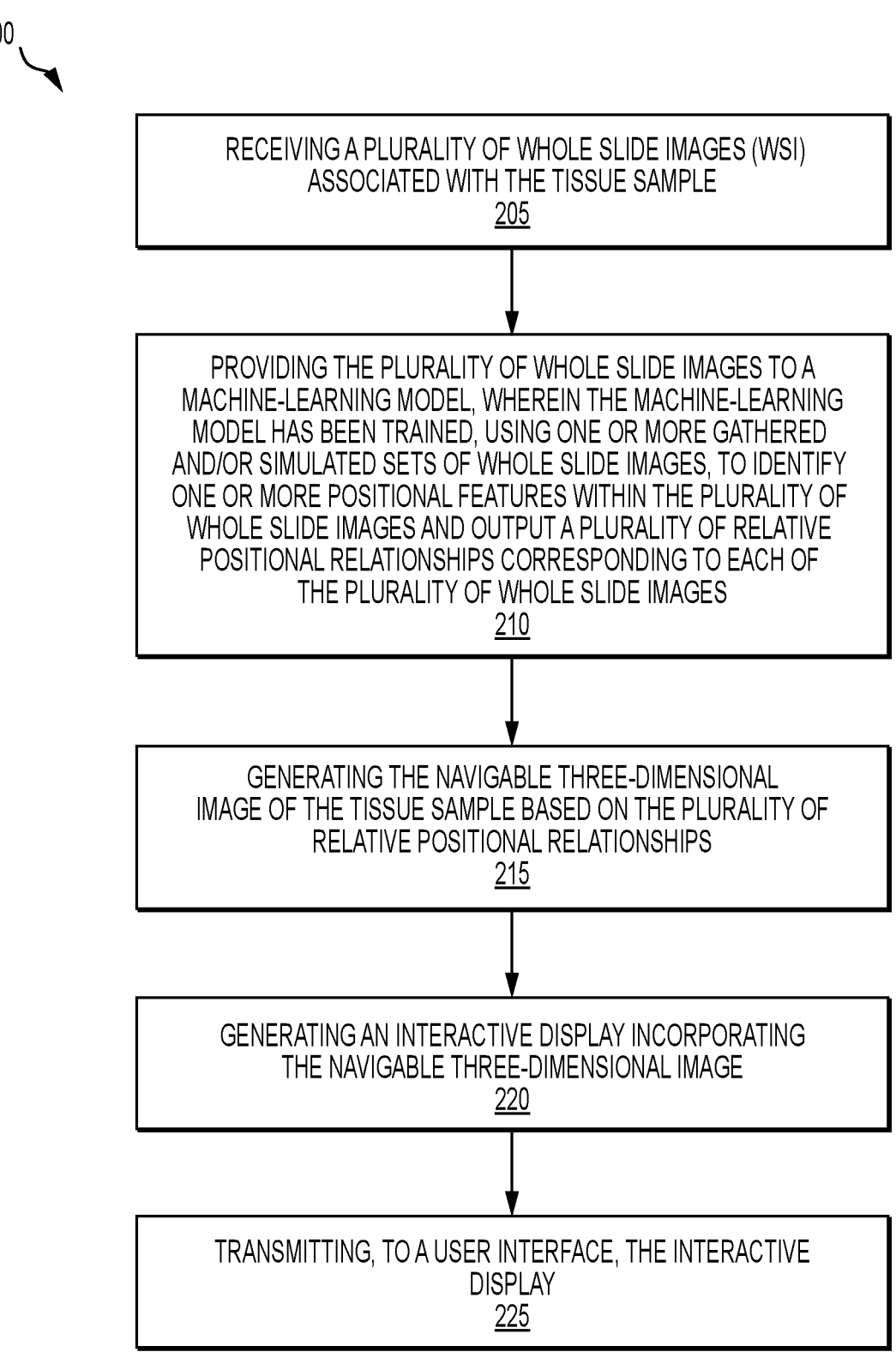

200

RECEIVING A PLURALITY OF WHOLE SLIDE IMAGES (WSI)
ASSOCIATED WITH THE TISSUE SAMPLE
205

PROVIDING THE PLURALITY OF WHOLE SLIDE IMAGES TO A
MACHINE-LEARNING MODEL, WHEREIN THE MACHINE-LEARNING
MODEL HAS BEEN TRAINED, USING ONE OR MORE GATHERED
AND/OR SIMULATED SETS OF WHOLE SLIDE IMAGES, TO IDENTIFY
ONE OR MORE POSITIONAL FEATURES WITHIN THE PLURALITY OF
WHOLE SLIDE IMAGES AND OUTPUT A PLURALITY OF RELATIVE
POSITIONAL RELATIONSHIPS CORRESPONDING TO EACH OF
THE PLURALITY OF WHOLE SLIDE IMAGES
210

GENERATING THE NAVIGABLE THREE-DIMENSIONAL
IMAGE OF THE TISSUE SAMPLE BASED ON THE PLURALITY OF
RELATIVE POSITIONAL RELATIONSHIPS
215

GENERATING AN INTERACTIVE DISPLAY INCORPORATING
THE NAVIGABLE THREE-DIMENSIONAL IMAGE
220

TRANSMITTING, TO A USER INTERFACE, THE INTERACTIVE
DISPLAY
225

*FIG. 2*

SYSTEMS AND METHODS FOR PROCESSING WHOLE SLIDE IMAGES USING MACHINE-LEARNING

RELATED APPLICATION(S)

This application claims priority to U.S. Provisional Application No. 63/498,342 filed Apr. 26, 2023, the entire disclosure of which is hereby incorporated herein by reference in its entirety.

TECHNICAL FIELD

Various embodiments of this disclosure relate generally to computer-implemented techniques for image processing. More specifically, particular embodiments of the present disclosure relate to systems and method for processing whole slide images using machine-learning.

BACKGROUND

Pathology slides may be conceptualized and/or prepared as two-dimensional images that represent a cross-section from a larger, three-dimensional sample (e.g., piece of tissue). However, some constraints presented by limiting a perception of slides to two dimension has translated to digital pathology, where scanned slides (e.g., whole slide images or WSIs) may be presented independently from one another. Such a two-dimensional, piece-meal presentation may make assessing or visualizing the often irregular, three-dimensional shapes and dimensions of biological structures (e.g., tumors) difficult.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In one aspect, an exemplary embodiment of a computer-implemented method for generating a navigable three-dimensional image of a tissue sample may include receiving a plurality of whole slide images (WSI) associated with the tissue sample. The method may further include providing the plurality of whole slide images to a machine-learning model. The machine-learning model may have been trained, using one or more prior patient and/or synthetically generated sets of whole slide images, to identify one or more positional features within the plurality of whole slide images and output a plurality of relative positional relationships corresponding to each of the plurality of whole slide images. The method may further include generating the navigable three-dimensional image of the tissue sample based on the plurality of relative positional relationships. The method may further include generating an interactive display incorporating the navigable three-dimensional image. The method may further include providing, to a user interface, the interactive display.

In another aspect, an exemplary embodiment of a system for generating a navigable three-dimensional image of a tissue sample may include a memory storing instructions and a processor operatively connected to the memory and configured to execute the instructions to perform operations. The operations may include receiving a plurality of whole slide images (WSI) associated with the tissue sample. The operations may further include providing the plurality of whole slide images to a machine-learning model. The machine-learning model may have been trained, using one or more prior patient and/or simulated sets of whole slide images, to identify one or more positional features within the plurality of whole slide images and output a plurality of relative positional relationships corresponding to each of the plurality of whole slide images. The operations may further include generating the navigable three-dimensional image of the tissue sample based on the plurality of relative positional relationships. The operations may further include generating an interactive display incorporating the navigable three-dimensional image. The operations may further include providing, to a user interface, the interactive display.

In a further aspect, an exemplary embodiment of a non-transitory computer-readable medium may include stored instructions that, when executed by one or more processors, perform operations. The operations may include receiving a plurality of whole slide images (WSI) associated with a tissue sample. The operations may further include providing the plurality of whole slide images to a machine-learning model. The machine-learning model may have been trained, using one or more prior patient and/or simulated sets of whole slide images, to identify one or more positional features within the plurality of whole slide images and output a plurality of relative positional relationships corresponding to each of the plurality of whole slide images. The operations may further include generating a navigable three-dimensional image of the tissue sample based on the plurality of relative positional relationships. The operations may further include generating an interactive display incorporating the navigable three-dimensional image. The method may further include providing, to a user interface, the interactive display.

Additional objects and advantages of the disclosed aspects will be set forth in part in the description that follows, and in part will be apparent from the description, or may be learned by practice of the disclosed aspects. The objects and advantages of the disclosed aspects will be realized and attained by means of the elements and combinations particularly pointed out in the appended claims.

It is to be understood that both the foregoing general description and the following detailed description are exemplary and explanatory only and are not restrictive of the disclosed aspects, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed aspects.

FIG. 2 depicts a flowchart of an exemplary method for generating a navigable three-dimensional image of a tissue sample, according to one or more embodiments.

Figure 1:
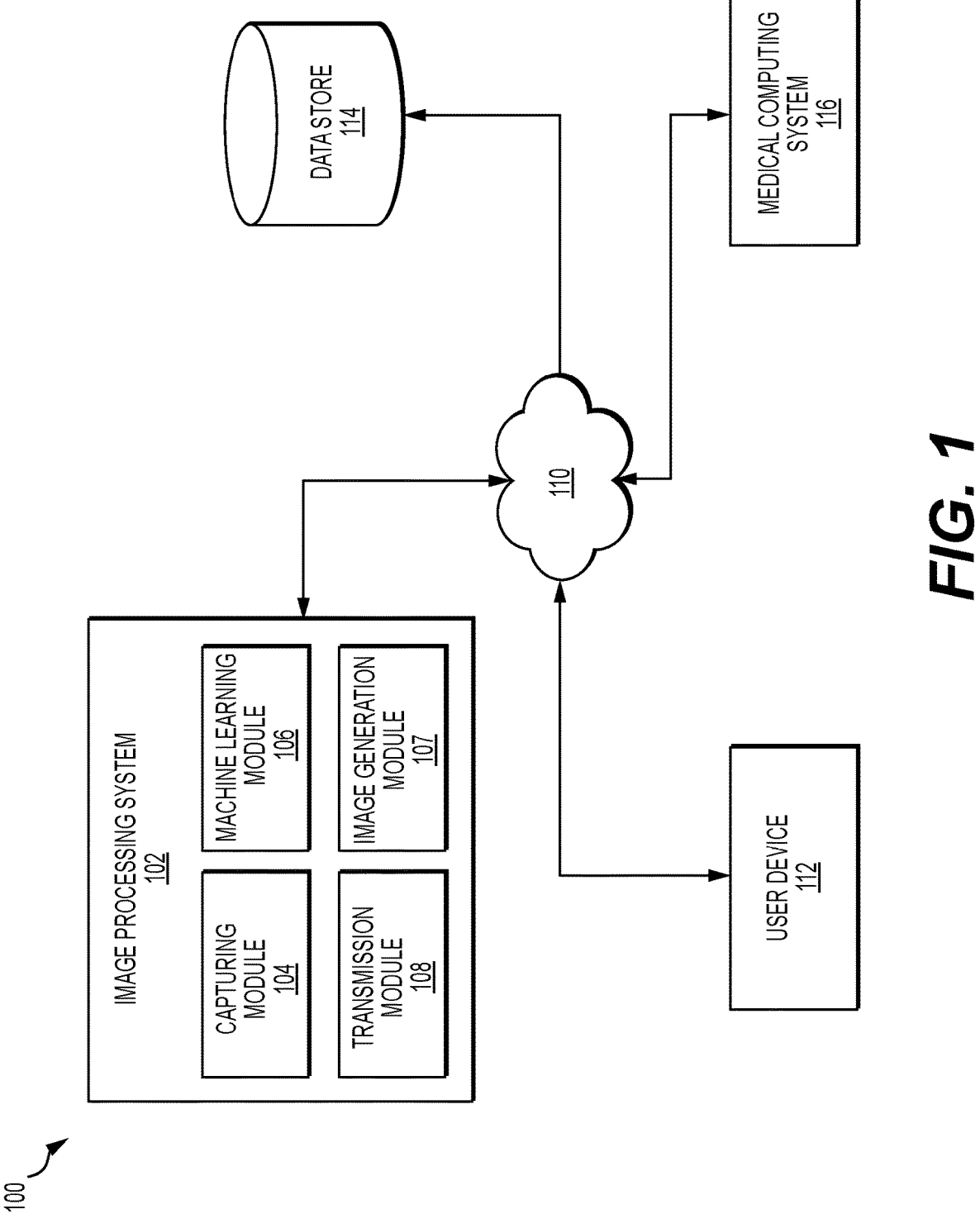
FIG. 1 depicts an exemplary environment for generating an interactive display, according to one or more embodiments.

Notably, for simplicity and clarity of illustration, certain aspects of the figures depict the general configuration of the various embodiments. Descriptions and details of well-known features and techniques may be omitted to avoid unnecessarily obscuring other features. Elements in the figures are not necessarily drawn to scale; the dimensions of some features may be exaggerated relative to other elements to improve understanding of the example embodiments.

DETAILED DESCRIPTION OF ASPECTS

Various aspects of the present disclosure relate generally to computer-implemented techniques for image processing, such as whole slide images (WSI) obtained using medical imaging. Aspects disclosed herein may provide digital tools configured to conceptualize and reconstruct two-dimensional images (e.g., whole slide images). For example, aspects disclosed herein may "stitch" sequential images together to represent a three-dimensional (3D) structure that can be viewed, explored, and/or interrogated from different angles and/or different levels or depths (e.g., from each of those different angles). Aspects disclosed herein may compare side-by-side and/or overlay spatially similar (e.g., based on depth) slides, or images of the same slide that has been treated in multiple steps (e.g., with a WSI image obtained at each step) for simultaneous or three-dimensional visualization. Stitching may refer herein to inferring orientation, inferring/filling 3D space (e.g., creating voxels) between single pairs of images that are known to be spatially similar (e.g., close together). In various embodiments, this may be done by using one or more machine-learning techniques and/or algorithms in sequence. For example, machine-learning techniques may be used to identify/recognize images with particular similarities (e.g., features, landmarks, or the like). An algorithm may then be used to register the images (e.g., with an image registration algorithm such as linear, non-linear, rotational, rigid, and the like). Machine-learning techniques may then be used to infer/fill in the 3D space (e.g., create voxels). A mosaic may be a three-dimensional representation of a plurality of images and/or may refer to inferring the orientation of a larger set of images.

Biological structures (e.g. tumors) may be irregular, three-dimensional shapes. Aspects disclosed herein may take these three-dimensional structures into account to present new opportunities for understanding pathology and treating or addressing pathological illnesses such as cancer.

Physical glass slides may represent one instance of a sample (e.g., treated tissue) at a given point in time. Multiple, spatially similar sections of very thin slices of tissue may be prepared to assess different and/or separate treatments for the tissue. For example, a pathologist may desire a secondary stain to further investigate or verify findings from a first stain, such as a hematoxylin and eosin (H&E) slide. In some cases, secondary stains are immunohisto-chemical (IHC) stains, but may be other secondary stains, sometimes referred to as "special stains," or "esoteric stains." Some forms of secondary stains may be considered permanent or destructive, in that the stain reagents are permanent and cannot be removed from the tissue sample, or that they permanently alter the composition of the tissue sample itself. The H&E slide may be prepared and reviewed by the pathologist, and then a similar piece or slice of tissue may be treated with the IHC stain on a separate glass slide. Pathologists may "co-register" the two slices or pieces of tissue, which may be nearly identical, on these glass slides to reconcile findings among the different preparations (here, the IHC and H&E preparations). Pathologists may co-register the two slices or pieces by alternating between their corresponding slides on a microscope and/or by physically overlaying the slides for review by a naked eye and/or via a microscope.

Aspects disclosed herein may provide solutions that allow for visualizing spatially similar sections of tissue by "stitching" images together to provide a single two-dimensional visualization and by rendering inferred three-dimensional visualizations from multiple two-dimensional whole slide images (WSIs). These solutions may also allow for inferring and rendering color of the three-dimensional visualizations.

In various embodiments, a three-dimensional sample may be inferred and/or viewed by providing two-dimensional navigation of sequential, spatially similar slides. For example, pathologists may navigate "up" and "down" the two-dimensional planes of a three-dimensional piece of tissue, where each plane corresponds to a whole slide image (WSI) obtained from an individual glass slide. For example, a method of generating a navigable three-dimensional model of a tissue may include receiving a plurality of WSIs, where each WSI corresponds to a different level or depth of a sample (e.g., tissue). The plurality of WSIs may be fed to a machine-learning model or system that has been trained to identify a level that corresponds to each received WSI. The machine learning model may order or organize the WSIs based on the identified level, and stack, stitch, or overlay the WSIs based on the identified level and/or order.

Therefore, the present disclosure provides for machine-learning and artificial intelligence based techniques of image processing. The logistical and financial challenges and/or undesired results or errors associated with manual analysis of images may be also be reduced. More specifically, techniques disclosed herein to generate a navigable three-dimensional image of a tissue sample may provide for faster, real-time, more accurate, and more efficient processing of image data and/or diagnosis pertaining to analysis of image data in comparison to conventional techniques. Techniques disclosed herein further reduce the computational resources required for such processing by, for example, leveraging machine-learning training to reduce just-in-time processing loads.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

As discussed herein, one or more machine-learning models may be trained to understand positional features in image data. Accordingly, machine-learning models disclosed herein are image processing machine-learning models. Such image-processing machine learning models may be trained using image and/or medical related data (e.g., whole slide images, patient data, etc., as discussed herein). An image processing machine-learning model trained to understand (e.g., identify) positional features and/or other image features based on image data may be trained to adjust one or more weights, layers, nodes, biases, and/or synapses based on the image related data. "Positional features" shall be used herein to indicate various visual morphology of a slide image. In examples, positional features may include anatomical features (e.g., cells, subcellular components, interstitial tissue, and the like) and/or histological features (e.g., staining patterns, tissue folds, and the like). In various embodiments, the positional features may also include general distinct landmarks of the gross (e.g., whole) image such as unique curvature, boundaries of tissue versus empty space, or the like. In various embodiments, the positional features may be included within training data for a machine-learning model or may be learned using weak supervision. An image-processing machine-learning model may include components (e.g., weights, layers, nodes, biases, and/or synapses) that collectively associate one or more of: a whole slide image with a depth of a tissue sample, a whole slide image with a position in a tissue sample, a relative positional relationship between two or more whole slide images with the two or more whole slide images; and/or the like. "Relative positional relationship" shall be used herein to indicate a position of two images within a three dimensional whole. For example, for two slide images that are from separate samples of a same piece of paraffin-embedded tissue, a relative positional relationship describes the relationship of the two images in three dimensional space. An image processing machine-learning model may correlate image information and patient medical data in a diagnostic context. An image processing machine-learning model may be trained to adjust one or more weights, layers, nodes, biases, and/or synapses to associate certain image data in view of a diagnostic context. For example, particular image features may be correlated with a particular diagnosis. In another example, particular positional features identified in the image data may be correlated with an inferred and/or determined tissue sample position associated with a whole image slide. In such examples, a three-dimensional image of a tissue sample may be constructed and/or generated from a set of individual whole slide images of the tissue sample by identifying the positional features of each whole slide image and relating the positional features identified for each whole slide image to all others in the set. In various embodiments, the three-dimensional image may be generated using one or more algorithms (e.g., machine-learning algorithms, or the like) to determine an orientation of the slide images relative to one another within three-dimensional space. Then, a second algorithm may be used to infer/fill in blank space between the pieces of tissue (e.g., creating voxels). In further embodiments, and in a case where the images or tissue slices are contorted/distorted, or the like, one or more algorithms may be used to register the images in three-dimensional space. In examples, if this is unsuccessful, the system may output an indication of an error (e.g., an error message or the like).

The execution of the machine-learning model may include deployment of one or more machine-learning techniques, such as a transformer model, graph neural network (GNN), linear regression, logistic regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve certain types of machine-learning and artificial intelligence, it should be understood that techniques according to this disclosure may be adapted to any suitable type of machine-learning and/or artificial intelligence. It should also be understood that the examples above are illustrative only. The techniques and technologies of this disclosure may be adapted to any suitable activity.

While various aspects relating to medical imaging and medical diagnostics (e.g., diagnosis of a medical condition based on medical imaging) are described in the present aspects as illustrative examples, the present aspects are not limited to such examples. For example, the present aspects can be implemented for other types of image processing.

FIG. 1 depicts an exemplary environment 100 that may be utilized with techniques presented herein. One or more user device(s) 112 may communicate across an electronic network 110. The one or more user device(s) 112 may be associated with a user, e.g., a user that is viewing and/or interacting with a generated navigable three-dimensional image, an administrator of one or more components of environment 100, and/or the like. As will be discussed in further detail below, one or more computing system(s) 102 may communicate with one or more of the other components of the environment 100 across electronic network 110.

The user device(s) 112 may be configured to enable a user to access and/or interact with other systems in the environment 100. For example, the user device(s) 112 may each be a computer system such as, for example, a desktop computer, a mobile device, a tablet, an augmented/virtual/extended reality device, and etc. In some embodiments, the user device(s) 112 may include one or more electronic application(s), e.g., a program, plugin, browser extension, etc., installed on a memory of the user device(s) 112. In some embodiments, the electronic application(s) may be associated with one or more of the other components in the environment 100. For example, the electronic application(s) may include one or more of system control software, system monitoring software, software development tools, etc.

In various embodiments, the environment 100 may include a data store 114 (e.g., database). The data store 114 may include a server system and/or a data storage system such as computer-readable memory such as a hard drive, flash drive, disk, etc. In some embodiments, the data store 114 includes and/or interacts with an application programming interface for exchanging data to other systems, e.g., one or more of the other components of the environment. The data store 114 may include and/or act as a repository or source for storing image data, whole slide images (WSI), a generated three-dimensional image, patient data, output data (e.g., from a machine-learning model), and the like (e.g., to be provided/transmitted to user device 112 or to/from any of the other components of environment 100).

In some embodiments, the components of the environment 100 are associated with a common entity, e.g., a service provider, an account provider, or the like. For example, in some embodiments, computing system 102, data store 114, and medical computing system 116 may be associated with a common entity. In some embodiments, one or more of the components of the environment is associated with a different entity than another. For example, computing system 102 may be associated with a first entity (e.g., a service provider) while medical computing system 116 may be associated with a second entity (e.g., a medical institution or provider). The systems and devices of the environment 100 may communicate in any arrangement. As will be discussed herein, systems and/or devices of the environment 100 may communicate in order to one or more of generate, train, or use a machine-learning model to process imaging data, among other activities.

As discussed in further detail below, the computing system(s) 102 may, one or more of, (i) generate, store, train, communicate with, or use a machine-learning model configured to process imaging data. The computing system(s) 102 may include a machine-learning model and/or instructions associated with the machine-learning model, e.g., instructions for generating a machine-learning model, training the machine-learning model, using the machine-learning model etc. The computing system(s) 102 may include instructions for retrieving data, adjusting data, e.g., based on the output of the machine-learning model, and/or operating a display of the user device(s) 112 to output generated responses to input, e.g., as adjusted based on the machine-learning model. The computing system(s) 102 may include training data, e.g., image data, and may include ground truth, e.g., (i) training whole slide images and (ii) training three-dimensional images to generate a navigable three-dimensional image.

As depicted in FIG. 1, computing system(s) 102 may include capturing module 104. In various embodiments, capturing module 104 is configured to receive a plurality of whole slide images (WSI) associated with a tissue sample. The whole slide images and/or associated data may be gathered and/or compiled by the computing system 102 or using components separate from environment 100. In examples, capturing module 104 may receive the whole slide images from medical computing system 116 via network 110. Medical computing system 116 may be a user device associated with a medial institution, a medical imaging device, or the like. A medical imaging device implementing medical computing system 116 may include image processing system 102, or image processing system 102 may be a separate component from medical computing system 116. A plurality of images (e.g., digital or electronic image or a whole slide image (WSI)) may be received into electronic storage (e.g., cloud-based storage, hard disk, RAM, etc.) such as data store 114. Further, and in various embodiments, capturing module 104 may receive patient data. In examples, patient data may include medical records, demographic information, medical predispositions, diagnoses and the like. Such patient data may be received by capturing module 104 from data store 114, medical computing system 116, user device 112, or the like.

In example, such image data and patient data may be provided to one or more image processing machine-learning models. The one or more image processing machine-learning models may be implemented, generated, trained, or the like by machine-learning module 106. The one or more image processing machine-learning models may be trained based on training data that includes historical/genuine/prior patient tissue images and/or simulated/synthetic image data, historical or simulated patient data, and/or the like. Synthetic image generation may use techniques described in U.S. application Ser. No. 17/645,197, which is incorporated herein by reference. The training data may be used to train the image processing machine-learning models by modifying one or more weighs, layers, synapses, biases, and/or the like of the image processing machine-learning models, in accordance with a machine-learning algorithm, as discussed herein. Alternatively, or in addition, such image data may be used to generate a three-dimensional image.

Computing system(s) 102 may also include image generation module 107. In various embodiments, image generation module 107 may be configured to generate a navigable three-dimensional image of a tissue sample based on an output of the one or more machine-learning models. In various embodiments, image generation module 107 may also be configured to generate an interactive display that incorporates the navigable three-dimensional image. In examples, the interactive display enables a user to navigate aspects of the three-dimensional image (e.g., zoom in/out, rotate, flip, view a cross-section, "peel back" layers of the three-dimensional image to view interior aspects, and the like). In further examples, the interactive display that incorporates the navigable three-dimensional image may be operable and/or configured to enable a user to navigate sample levels (e.g., tissue depths of the tissue sample associated with the image(s). Each level may be associated with a WSI). In other various embodiments, image generation module 107 may be configured to generate a side-by-side display incorporating graphical representations of two or more images (e.g., whole slide images). In various additional embodiments, image generation module 107 may be configured to place a set of whole slide images in an order based an output of a machine-learning model, and may be further configured to "stitch" the whole slide images together based on the ordering.

As depicted in FIG. 1, computing system(s) 102 may also include transmission module 108. In various embodiments, transmission module 107 may be configured to transmit the interactive display, the side-by-side display, and/or the generated navigable three-dimensional image to a user interface, such as of user device 112. In further embodiments, transmission module 107 may be further configured to transmit the aforementioned to data store 114 (e.g., for storage or retention), or to medical computing system 116 (e.g., for storage, display, further processing, or the like).

As depicted in FIG. 1, environment 100 may also include electronic network 110. In various embodiments, the electronic network 110 may be a wide area network ("WAN"), a local area network ("LAN"), personal area network ("PAN"), or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

Although depicted as separate components in FIG. 1, it should be understood that a component or portion of a component in the environment 100 may, in some embodiments, be integrated with or incorporated into one or more other components. In another example, the computing system 102 may be integrated in a data storage system. The data storage system may be configured to communicate and/or receive/send data across electronic network 110 to other components of environment 100. In some embodiments, operations or aspects of one or more of the components discussed above may be distributed amongst one or more other components. Any suitable arrangement and/or integration of the various systems and devices of the environment 100 may be used.

Further aspects of the computing system 102 and how a navigable three-dimensional image and/or an interactive display are generated are discussed in further detail in the methods below, with respect to FIGS. 2-3. In the following methods and systems, various acts may be described as performed or executed by a component from FIG. 1, such as the computing system 102, the user device 112, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

FIG. 2 depicts a flowchart of an exemplary method 200 for generating a navigable three-dimensional image of a tissue sample. At step 205, a plurality of whole slide images (WSI) are received (e.g., such as by capturing module 104 as described with respect to FIG. 1). The whole slide images may be associated with a tissue sample. For example, each whole slide image may be associated with a portion of the tissue sample imaged and/or sampled at a depth/level of the tissue sample. At step 210, the plurality of whole slide images is provided to a machine-learning model. In various implementations, the machine-learning model had been trained, using one or more gathered prior patient and/or simulated sets of whole slide images and/or patient data, to identify one or more positional features within the plurality of whole slide images and output a plurality of relative positional relationships corresponding to each of the plurality of whole slide images.

Generally, an artificial intelligence or machine-learning model disclosed herein includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between image data and identify one or more positional features within the image data, such that the trained machine-learning model is configured to output a plurality of relative positional relationships corresponding to the image data (e.g., whole slide images).

In various embodiments, the variables of a machine-learning model may be interrelated in any suitable arrangement in order to generate the output. For example, in some embodiments, the machine-learning model may include image processing architecture that is configured to identify, isolate, and/or extract positional features in input image data. For example, the machine-learning model may include one or more convolutional neural network ("CNN") configured to identify features in the whole slide images, and may include further architecture, e.g., a connected layer, neural network, etc., configured to determine a relative positional relationship between the identified features in order to generate a navigable three-dimensional image, or the like.

In some embodiments, the machine-learning or artificial intelligence model may include a Recurrent Neural Network ("RNN"). Generally, RNNs are a class of feed-forward neural networks that may be well adapted to processing a sequence of inputs. In some embodiments, the machine-learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive whole slide images as input, and generate an output. In some embodiments, the machine-learning model may include a transformer model and/or graph neural network (GNN) model. Such models may be configured to generate an output from input data.

In various embodiments, a method of training a machine-learning and/or artificial intelligence model to generate or provide a three-dimensional image and/or produce an interactive graphical user interface to display the tissue may include a step of receiving a plurality of images (e.g., electronic or digital images or whole slide images (WSIs)) into electronic or digital storage (e.g., cloud-based storage, hard disk, RAM, etc.). The images may be associated with a plurality of two-dimensional levels, dimensions, and/or views of a sample of a tissue of a patient. In some examples, the method may include a step of receiving additional data, such as corresponding metadata (e.g., whether the slides are treated), patient data (e.g., diagnosis, disease progression, etc.), data input by a practitioner, and the like. In some examples, the images and/or additional data may be received for multiple points of time.

The method may include a step of training a machine-learning model or system to determine an order of the images and/or to produce a three-dimensional navigable image from the plurality of received images. The trained system may receive as input the received images and any additional data, and be trained to output an ordering or placement position of the received images to create a three-dimensional image, the three-dimensional image, and/a corresponding graphical user interface to navigate the three-dimensional image.

The system may be trained using weak supervision or strong supervision to identify regions of interest, biomarkers, or other landmarks and/or their dimensions that may help to determine the order of images, a depth level of the image, a relationship among the images, or the like. For example, the system may be trained using weak supervision, where a machine-learning model (e.g., multi-layer perceptron (MLP), convolutional neural network (CNN), Transformers, graph neural network, support vector machine (SVM), random forest, etc.) may utilize multiple instance learning (MIL) using weak labeling of the digital image or a collection of images. The labels of the training data may correspond to a positional label (e.g., order of the images, a depth of the sample that the image corresponds to, a stitching or mosaic label, coordinates, etc.) used to create the three-dimensional image. The trained model may predict a position arrangement, order, coordinates, etc. of the group of received images and/or of each individual image to co-register the images and create the three-dimensional image.

In some examples, instead of receiving labels for training, the system may receive a completed three-dimensional image or model, or a graphical user interface. The trained system may predict the three-dimensional image from the received images by, for example, identifying common salient regions among the images, analyzing their dimensions, analyzing color values, and determining their depths and/or placements (e.g., using edge detection, etc.).

For strongly supervised training, the image, the location of salient regions, an arrangement or order of the images, color values of each pixel, and/or a three-dimensional image to create may be received as input(s). Furthermore, information about whether the images include salient regions and/or certain diseases (e.g., whether they were malignant or benign) may also be received. For 2D images, e.g., whole slide images (WSI) in pathology, certain aspects (e.g., salient regions, disease information, and/or positional information) may be specified with pixel-level labeling, bounding box-based labeling or polygon-based labeling. While aspects disclosed herein are described in the context of stitching together WSIs, aspects disclosed herein may also be used to stitch together other types of images to create an interactive three-dimensional image, such as CT and MRI scans. For these other types of received images that may be more three-dimensional (e.g., CT and MRI scans), these aspects (e.g., salient regions, disease information, positional information) may be specified with voxel-level labeling, using a cuboid, etc. or using a parameterized representation allowing for sub-voxel-level labeling, such as parameterized curves or surfaces, or deformed template.

In some examples, the machine-learning model (e.g., R-CNN, Faster R-CNN, Selective Search, etc.) may be trained using bounding box or polygon-based supervision using bounding boxes or polygons that specify sub-regions of the received images that are salient, relevant, have certain color values for certain pixels, or as having a certain positional relationship (e.g., coordinates) to other sub-regions and/or images.

In some examples, the machine-learning model (e.g., Mask R-CNN, U-Net, Fully Convolutional Neural Network, Transformers, etc.) may be trained utilizing pixel-level or voxel-level labeling where individual pixels/voxels are identified as being salient, relevant, as having a certain color value, and/or as having a certain positional relationship to other pixels/voxels and/or images.

The machine-learning model may be trained to identify salient regions, biomarkers, color labels, etc. During training, other image processing techniques may be used, such as image segmentation or partitioning, using thresholding based on a variance of pixels in a tile to identify whether those pixels are foreground (and/or have a certain color value), using Otsu's method, comparing tile pixel values to a reference foreground distribution, etc. In some examples, the machine-learning model may be given input labels or segmentation masks describing salient regions or other relevant attributes or aspects. In some examples, the machine-learning model may be trained to extract a vector of features from each foreground tile to create a tile-level feature vector using a range of techniques such as hand-engineered features (e.g., scale invariant feature transform (SIFT) descriptors, oriented FAST and rotated BRIEF (ORB) descriptors, rotation invariant feature transform (RIFT) descriptors, speeded up robust features (SURF) descriptors, etc.), pre-trained CNN embeddings using supervised learning, pre-trained CNN embeddings using self-supervised learning techniques, pre-trained transformer neural network features, etc. The machine-learning model may learn to use the tile-level feature vectors in determining the three-dimensional image. For example, the machine-learning model may aggregate the tile-level feature vectors of each image (e.g., WSI) and classify the image as having certain attributes and/or corresponding to a certain depth of the tissue. The method may include a step of assigning, for each image, a label that indicates a positional relationship to the other images to be used for stitching.

The system may have been trained to infer three-dimensional voxels from two-dimensional pixel information obtained from the plurality of WSIs, which may represent multiple sequential, spatially similar slides, to determine, calculate, and/or create an image or model that can be navigated fully in three-dimensions, much like any computer-aided drawing interface. Specifically, the system may have been trained to create a three-dimensional model that is representative of a single stain while receiving slide inputs that are of a different stain or of a combination of stains (e.g., H&E and IHC).

The system may be trained to automatically co-register tissue for side-by-side navigation and/or an overlayed display. The system may be trained to automatically co-register the WSIs and/or coordinates of the sample on two or more WSIs, and determining the image may include automatically co-registering the WSIs and/or coordinates of the sample on two or more WSIs. The system may output (e.g., to memory and/or a display) the determined three-dimensional image and/or model.

The output may be configured to display a side-by-side display of multiple WSIs and/or slides based on the automatic co-registration of the coordinates of the tissue on two slides. Alternatively or in addition thereto, the output may be configured to display an overlayed image of multiple WSIs as a single two-dimensional image. Displayed pixels may be based on an average of color information contained in the overlayed displayed pixels with differential staining. The display and/or output may provide a graphical user interface, which may include image editing and manipulation tools, such as white-balancing and color channel filtering, to highlight salient regions and/or features of interest. The salient regions may have been determined by an artificial intelligence and/or machine learning model or system. In various implementations, the display could be output to a heads-up display, such as a virtual/augmented/extended reality system/headset. The virtual/augmented/extended reality system may also be equipped with one or more components that enable navigation of the display in three-dimensional space. In other examples, the display may be output to an application installed on a user device (e.g., a web-based application, an application running locally on the user device, or the like). In further embodiments, image editing and manipulation tools may include two- and three-dimensional measurement tools (e.g., for linear, non-linear, polygon, and complex three-dimensional structures).

The system may include one or more computer vision algorithm(s) for rendering a more detailed or complete three-dimensional image. In addition, the system may include one or more computer vision algorithm(s) for comparing overlayed slides.

At step 215, a navigable three-dimensional image is generated based on the output relative positional relationships. At step 220, an interactive display incorporating the navigable three-dimensional image is generated. At step 225, the interactive display is transmitted to a user interface.

Figure 3:
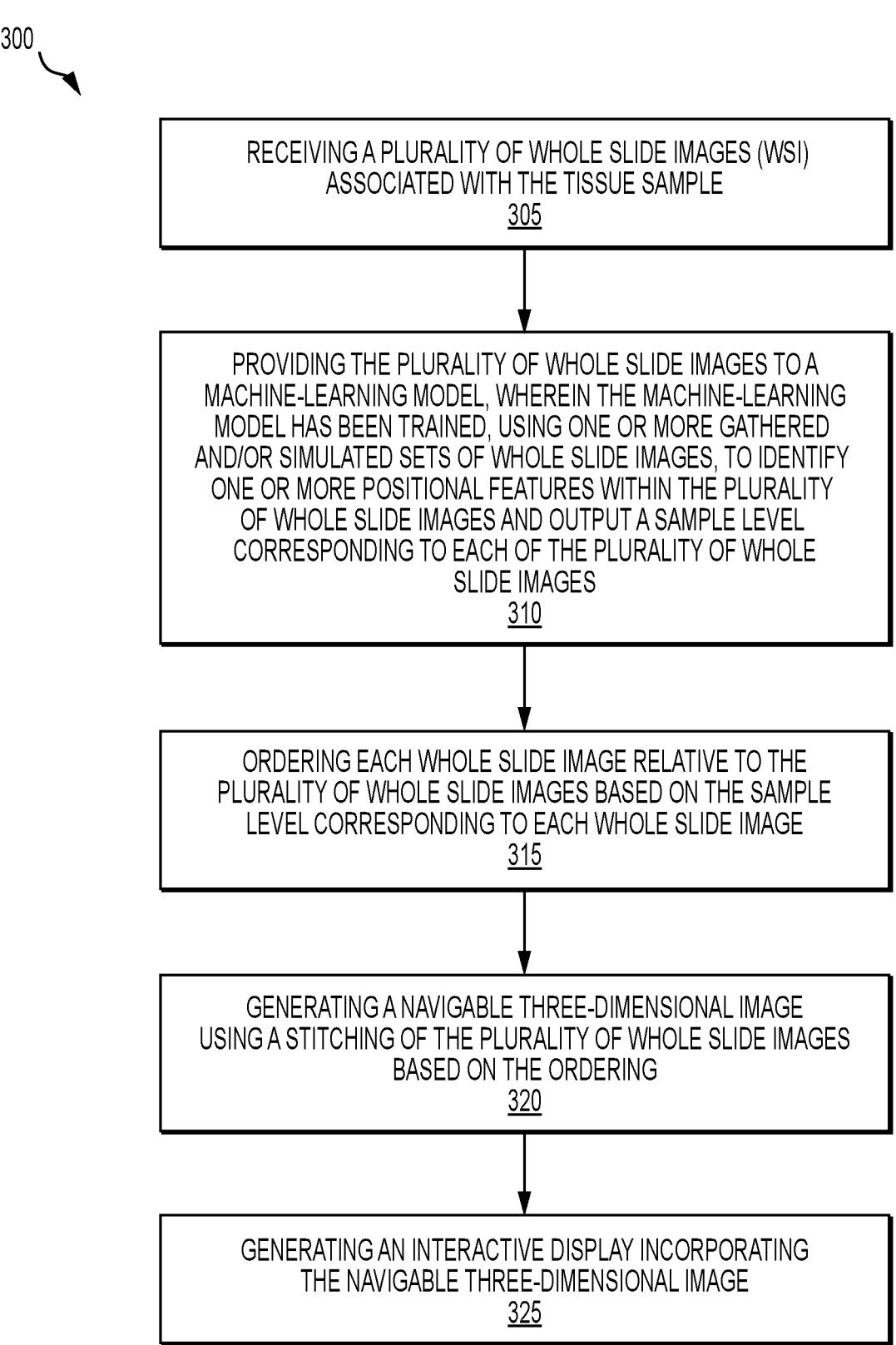
FIG. 3 depicts a flowchart of an exemplary method for generating a navigable three-dimensional image, according to one or more alternative embodiments.

FIG. 3 depicts a flowchart of an exemplary method 300 for generating a navigable three-dimensional image of a tissue sample, according to an alternative embodiment. At step 305, a plurality of whole slide images (WSI) are received (e.g., such as by capturing module 104 as described with respect to FIG. 1). The whole slide images may be associated with a tissue sample. For example, each whole slide image may be associated with a portion of the tissue sample imaged and/or sampled at a depth/level of the tissue sample. At step 310, the plurality of whole slide images is provided to a machine-learning model. In various implementations, the machine-learning model had been trained, using one or more gathered prior patient and/or simulated sets of whole slide images and/or patient data, to identify one or more positional features within the plurality of whole slide images and output a sample level corresponding to each of the plurality of whole slide images. In examples, the sample level corresponds to a depth of the tissue sample.

A method of using a trained model or system may include a step of receiving a plurality of images (e.g., digital or electronic image or a whole slide image (WSI)) into electronic storage (e.g., cloud-based storage, hard disk, RAM, etc.)

The method may include a step of applying the trained machine-learning model to the plurality of images to co-register the images and/or otherwise determine a positional relationship, or, alternatively or in addition thereto, to create a three-dimensional image (e.g., based on the co-registration). For example, the method may include determining a depth level or order of the two-dimensional images, and overlaying the two-dimensional images according to the determined depth level. In some examples, the method may include determining a horizontal position of the two-dimensional images, and arranging two or more of the received two-dimensional images side-by-side to provide a continuous display of the sample. In some examples, the method may include determining a color label or value for various tiles and/or pixels of each image, and displaying a three-dimensional image that shows an average of the color values along the depths and/or levels for each pixel along a horizontal or vertical direction of the three-dimensional image.

In some examples, the method may include a step of applying the trained machine-learning model to calculate a graphical user interface configured to navigate the three-dimensional image to display the different levels, depths, views, and/or angles of the three-dimensional images based on the two-dimensional images. The graphical user interface may be explored by a pathologist to better analyze the received images and sample.

At step 315, each whole slide image is ordered relative to the plurality of whole slide images based on the sample level corresponding to each whole slide image. At step 320, a navigable three-dimensional image is generated using a stitching of the plurality of whole slide images based on the ordering. In examples, the interactive display is operable to navigate sample levels. At step 325, an interactive display incorporating the navigable three-dimensional image is generated.

Figure 4:
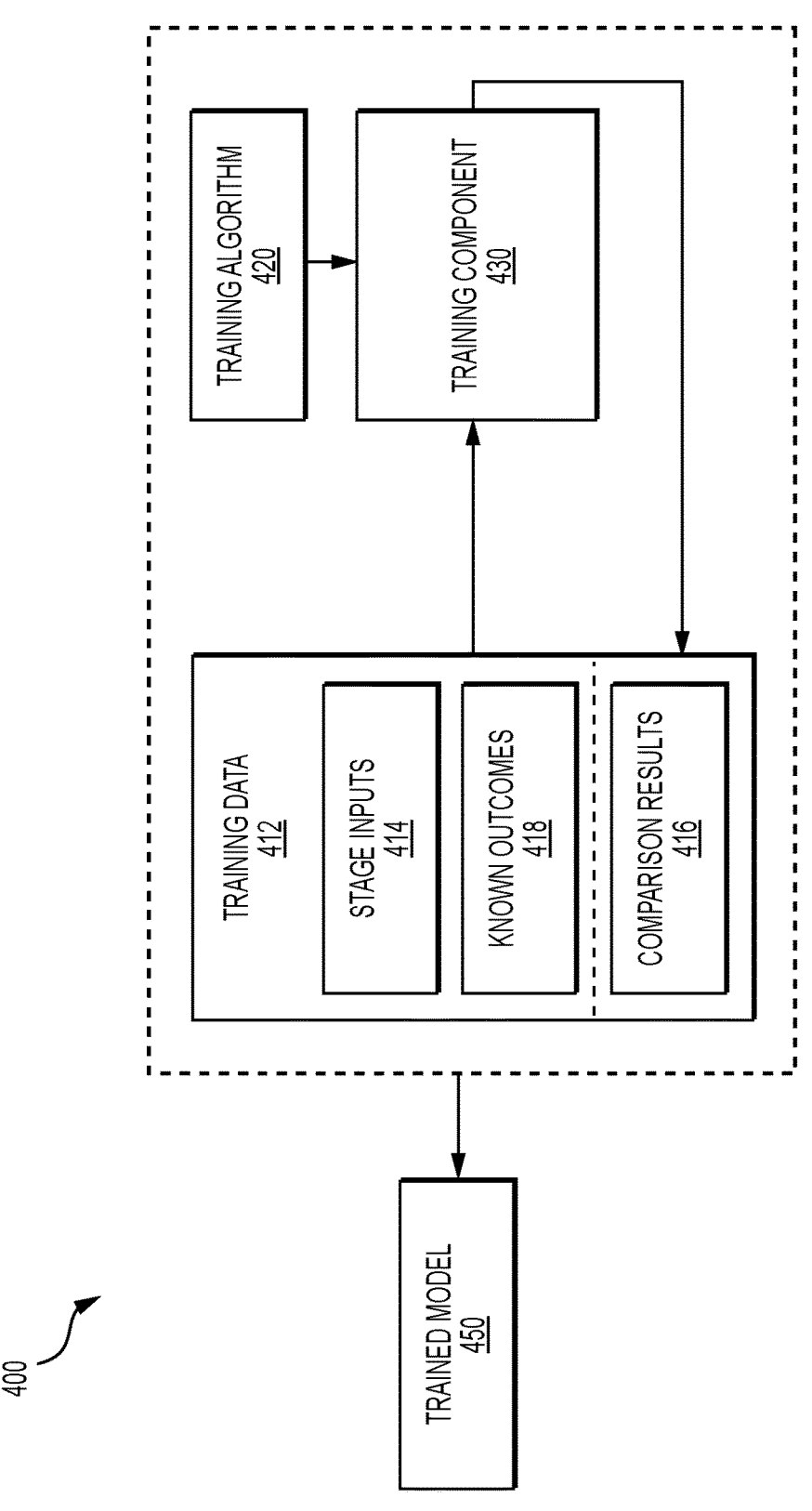
FIG. 4 depicts a flow diagram for training a machine-learning model, according to one or more embodiments.

FIG. 4 depicts a flow diagram for training a machine-learning model. As shown in flow diagram 400 of FIG. 4, training data 412 may include one or more of stage inputs 414 and known outcomes 418 related to a machine-learning model to be trained. The stage inputs 414 may be from any applicable source including a component or set shown in the figures provided herein. The known outcomes 418 may be included for machine-learning models generated based on supervised or semi-supervised training. An unsupervised machine-learning model might not be trained using known outcomes 418. Known outcomes 418 may include known or desired outputs for future inputs similar to or in the same category as stage inputs 414 that do not have corresponding known outputs.

The training data 412 and a training algorithm 420 may be provided to a training component 430 that may apply the training data 412 to the training algorithm 420 to generate a trained machine-learning model 450. According to an implementation, the training component 430 may be provided comparison results 416 that compare a previous output of the corresponding machine-learning model to apply the previous result to re-train the machine-learning model. The comparison results 416 may be used by the training component 430 to update the corresponding machine-learning model. The training algorithm 420 may utilize machine-learning networks and/or models including, but not limited to a deep learning network such as Graph Neural Networks (GNN), Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 400 may be a trained machine-learning model 450.

A machine-learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine-learning model (e.g., a trained model) based on the training. Once trained, the machine-learning model may output machine-learning model outputs in accordance with the subject matter disclosed herein. According to an implementation, one or more machine-learning models disclosed herein may continuously be updated based on feedback associated with use or implementation of the machine-learning model outputs.

It should be understood that aspects in this disclosure are exemplary only, and that other aspects may include various combinations of features from other aspects, as well as additional or fewer features.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

Figure 5:
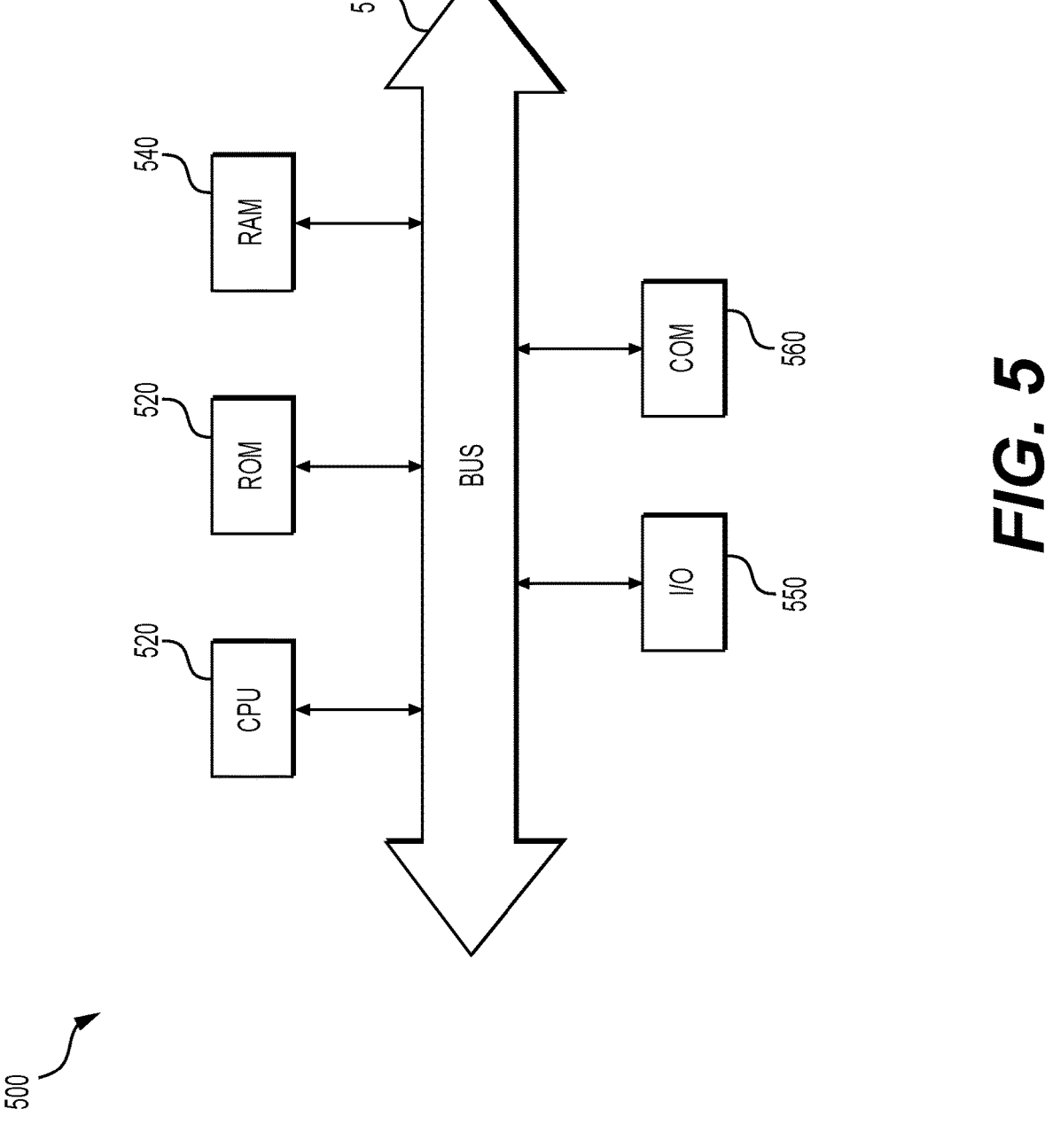
FIG. 5 depicts an example of a computing device, according to one or more embodiments.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example a bus, message queue, network, or multi-core message-passing scheme.

Device 500 may also include a main memory 540, for example, random access memory (RAM), and also may include a secondary memory 530. Secondary memory 530, e.g. a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include similar means for allowing computer programs or other instructions to be loaded into device 500. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 500 may also include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

One or more techniques presented herein may enable a user, to better interact with a digital image of a glass slide that may be presented on a screen, in a virtual reality environment, in an augmented reality environment, or via some other form of visual display. One or more techniques presented herein may enable a natural interaction closer to traditional microscopy with less fatigue than using a mouse, keyboard, and/or other similar standard computer input devices.

The controllers disclosed herein may be comfortable for a user to control. The controllers disclosed herein may be implemented anywhere that digital healthcare is practiced, namely in hospitals, clinics, labs, and satellite or home offices. Standard technology may facilitate connections between input devices and computers (USB ports, Bluetooth (wireless), etc.) and may include customer drivers and software for programming, calibrating, and allowing inputs from the device to be received properly by a computer and visualization software.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed aspects may be applicable to any environment, such as a desktop or laptop computer, an automobile entertainment system, a home entertainment system, etc. Also, the disclosed aspects may be applicable to any type of Internet protocol.

It should be appreciated that in the above description of exemplary aspects of the invention, various features of the invention are sometimes grouped together in a single aspect, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed aspect. Thus, the claims following the Detailed Description are hereby expressly incorporated into this Detailed Description, with each claim standing on its own as a separate aspect of this invention.

Furthermore, while some aspects described herein include some but not other features included in other aspects, combinations of features of different aspects are meant to be within the scope of the invention, and form different aspects, as would be understood by those skilled in the art. For example, in the following claims, any of the claimed aspects can be used in any combination.

Thus, while certain aspects have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Operations may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for generating a navigable three-dimensional image of a tissue sample, the method comprising:

receiving, by one or more processors, a plurality of whole slide images (WSI) associated with the tissue sample;

providing, by the one or more processors, the plurality of whole slide images to a machine-learning model, wherein the machine-learning model has been trained, using one or more prior patient and/or synthetically generated sets of whole slide images, to identify one or more positional features within the plurality of whole slide images and output a plurality of relative positional relationships corresponding to each of the plurality of whole slide images;

generating, by the one or more processors, the navigable three-dimensional image of the tissue sample based on the plurality of relative positional relationships;

generating, by the one or more processors, an interactive display incorporating the navigable three-dimensional image; and providing, to a user interface and by the one or more processors, the interactive display.

2. The computer-implemented method of claim 1, further comprising co-registering two or more whole slide images of the plurality of whole slide images based on the plurality of relative positional relationships.

3. The computer-implemented method of claim 2, further comprising:

generating, by the one or more processors, a side-by-side display incorporating graphical representations of the two or more whole slide images based on the co-registering; and providing, to the user interface and by the one or more processors, the side-by-side display.

4. The computer-implemented method of claim 3, wherein displayed pixels of the side-by-side display are based on an average of color information.

5. The computer-implemented method of claim 1, further comprising:

providing, by the one or more processors, the plurality of whole slide images to the machine-learning model, wherein the machine-learning model has been trained, using one or more prior patient and/or simulated sets of whole slide images, to identify one or more positional features within the plurality of whole slide images and output a sample level corresponding to each of the plurality of whole slide images.

6. The computer-implemented method of claim 5, further comprising:

ordering, by the one or more processors, each whole slide image relative to the plurality of whole slide images based on the sample level corresponding to each whole slide image.

7. The computer-implemented method of claim 6, further comprising:

generating, by the one or more processors, the navigable three-dimensional image using an image stitching of the plurality of whole slide images, the image stitching based on the ordering.

8. The computer-implemented method of claim 7, further comprising:

generating, by the one or more processors, an interactive display incorporating the navigable three-dimensional image, the interactive display operable to navigate sample levels.

9. A system for generating a navigable three-dimensional image of a tissue sample, the system comprising:

a memory storing instructions and a processor operatively connected to the memory and configured to execute the instructions to perform operations comprising:

receiving, by one or more processors, a plurality of whole slide images (WSI) associated with the tissue sample;

providing, by the one or more processors, the plurality of whole slide images to a machine-learning model, wherein the machine-learning model has been trained, using one or more prior patient and/or simulated sets of whole slide images, to identify one or more positional features within the plurality of whole slide images and output a plurality of relative positional relationships corresponding to each of the plurality of whole slide images;

generating, by the one or more processors, the navigable three-dimensional image of the tissue sample based on the plurality of relative positional relationships;

generating, by the one or more processors, an interactive display incorporating the navigable three-dimensional image; and providing, to a user interface and by the one or more processors, the interactive display.

10. The system of claim 9, the operations further comprising co-registering two or more whole slide images of the plurality of whole slide images based on the plurality of relative positional relationships.

11. The system of claim 10, the operations further comprising:

generating, by the one or more processors, a side-by-side display incorporating graphical representations of the two or more whole slide images based on the co-registering; and providing, to the user interface and by the one or more processors, the side-by-side display.

12. The system of claim 9, the operations further comprising:

providing, by the one or more processors, the plurality of whole slide images to the machine-learning model, wherein the machine-learning model has been trained, using one or more prior patient and/or simulated sets of whole slide images, to identify one or more positional features within the plurality of whole slide images and output a sample level corresponding to each of the plurality of whole slide images.

13. The system of claim 12, the operations further comprising:

ordering, by the one or more processors, each whole slide image relative to the plurality of whole slide images based on the sample level corresponding to each whole slide image.

14. The system of claim 13, the operations further comprising:

generating, by the one or more processors, the navigable three-dimensional image using an image stitching of the plurality of whole slide images, the image stitching based on the ordering.

15. A non-transitory computer-readable medium storing instructions that, when executed by one or more processors, perform operations including:

receiving, by one or more processors, a plurality of whole slide images (WSI) associated with a tissue sample;

providing, by the one or more processors, the plurality of whole slide images to a machine-learning model, wherein the machine-learning model has been trained, using one or more prior patient and/or simulated sets of whole slide images, to identify one or more positional features within the plurality of whole slide images and output a plurality of relative positional relationships corresponding to each of the plurality of whole slide images;

generating, by the one or more processors, a navigable three-dimensional image of the tissue sample based on the plurality of relative positional relationships;

generating, by the one or more processors, an interactive display incorporating the navigable three-dimensional image; and providing, to a user interface and by the one or more processors, the interactive display.

16. The non-transitory computer-readable medium of claim 15, the operations further comprising co-registering two or more whole slide images of the plurality of whole slide images based on the plurality of relative positional relationships.

17. The non-transitory computer-readable medium of claim 16, the operations further comprising:

generating, by the one or more processors, a side-by-side display incorporating graphical representations of the two or more whole slide images based on the co-registering; and providing, to the user interface and by the one or more processors, the side-by-side display.

18. The non-transitory computer-readable medium of claim 15, the operations further comprising:

providing, by the one or more processors, the plurality of whole slide images to the machine-learning model, wherein the machine-learning model has been trained, using one or more prior patient and/or simulated sets of whole slide images, to identify one or more positional features within the plurality of whole slide images and output a sample level corresponding to each of the plurality of whole slide images.

19. The non-transitory computer-readable medium of claim 18, the operations further comprising:

ordering, by the one or more processors, each whole slide image relative to the plurality of whole slide images based on the sample level corresponding to each whole slide image.

20. The non-transitory computer-readable medium of claim 19, the operations further comprising:

generating, by the one or more processors, the navigable three-dimensional image using an image stitching of the plurality of whole slide images, the image stitching based on the ordering.

* * * * *